(12) United States Patent
Strippoli

(10) Patent No.: US 12,037,805 B2
(45) Date of Patent: Jul. 16, 2024

(54) PNEUMATIC TELESCOPIC COLUMN ASSEMBLY

(71) Applicant: FIRECO S.R.L. A SOCIO UNICO, Gussago (IT)

(72) Inventor: Giancarlo Strippoli, Gussago (IT)

(73) Assignee: FIRECO S.R.L. A SOCIO UNICO, Gussago (IT)

( * ) Notice: Subject to any disclaimer, the term of this patent is extended or adjusted under 35 U.S.C. 154(b) by 179 days.

(21) Appl. No.: 17/802,986

(22) PCT Filed: Mar. 2, 2021

(86) PCT No.: PCT/IB2021/051719
§ 371 (c)(1),
(2) Date: Aug. 29, 2022

(87) PCT Pub. No.: WO2021/176343
PCT Pub. Date: Sep. 10, 2021

(65) Prior Publication Data
US 2023/0108329 A1    Apr. 6, 2023

(30) Foreign Application Priority Data
Mar. 2, 2020 (IT) .................. 102020000004345

(51) Int. Cl.
*E04H 12/18* (2006.01)
*E04H 12/34* (2006.01)
(Continued)

(52) U.S. Cl.
CPC ............ *E04H 12/182* (2013.01); *E04H 12/34* (2013.01); *F15B 15/16* (2013.01); *F15B 15/261* (2013.01); *F16B 7/105* (2013.01)

(58) Field of Classification Search
CPC ....... E04H 12/182; E04H 12/34; F15B 15/16; F15B 15/165; F15B 15/261; F16B 7/105; H01Q 1/10; H01Q 1/103
(Continued)

(56) References Cited

U.S. PATENT DOCUMENTS 2,685,353 A * 8/1954 Caskie .................. E04H 12/182
                                                           403/108
2,708,493 A * 5/1955 Badertscher .......... E04H 12/187
                                                           403/324
(Continued)

FOREIGN PATENT DOCUMENTS

| CN | 110453967 A | 11/2019 | |
| DE | 2546145 A1 | 4/1977 | |
| KR | 20110084649 A * | 7/2011 | ........... H01Q 1/1242 |

OTHER PUBLICATIONS

International Search Report, issued in PCT/IB2021/051719, mailed Jul. 5, 20201, Rijswijk, NL.

*Primary Examiner* — James M Ference
(74) *Attorney, Agent, or Firm* — ArentFox Schiff LLP; Michael Fainberg

(57) ABSTRACT

A pneumatic telescopic column assembly for supporting and moving military equipment, communication equipment, lighting equipment and/or surveillance equipment is provided. The pneumatic telescopic column assembly extends along an axis and has a plurality of tube groups telescopically configurable between a compact configuration and an extended configuration. The plurality of tube groups has a base tube group, an intermediate tube group and a head tube group. The base tube group has a base tube element and a base locking ring that has at least one horizontal latch, at least one actuator and at least one vertical latch. The intermediate tube group has an intermediate tubular element and an intermediate locking ring that has at least one
(Continued)

horizontal intermediate latch. The tubular head group has a tubular head element.

15 Claims, 10 Drawing Sheets

(51) Int. Cl.
*F15B 15/16* (2006.01)
*F15B 15/26* (2006.01)
*F16B 7/10* (2006.01)

(58) Field of Classification Search
USPC .................. 52/115, 118; 212/292, 348, 349; 403/324
See application file for complete search history.

(56) References Cited

U.S. PATENT DOCUMENTS

| | | | | |
|---|---|---|---|---|
| 2,835,520 A * | 5/1958 | Schiring | .............. | A61B 6/4464 378/197 |
| 4,433,515 A * | 2/1984 | Mentzer | ................ | B66C 23/708 212/292 |
| 4,594,824 A * | 6/1986 | Ziegler | .................... | F21V 21/22 52/118 |
| 4,663,900 A * | 5/1987 | Rehm | ....................... | H01Q 1/10 212/292 |
| 5,315,795 A * | 5/1994 | Chae | ...................... | E04H 12/185 343/901 |
| 5,333,422 A * | 8/1994 | Warren | .................. | E04H 12/182 52/118 |
| 6,484,469 B2 * | 11/2002 | Drake | ....................... | E04C 3/30 52/118 |
| 9,670,948 B1 * | 6/2017 | Wasson | ................... | F16B 7/105 |
| 10,113,573 B2 * | 10/2018 | Kemp | .................... | E04H 12/182 |
| 11,118,372 B2 * | 9/2021 | Young | ..................... | F16B 7/105 |
| 2012/0079778 A1 * | 4/2012 | Wasson | ................ | H01Q 1/1235 52/111 |
| 2012/0205510 A1 * | 8/2012 | Fortier | ................... | F16M 11/18 248/423 |
| 2015/0050070 A1 * | 2/2015 | Dykes | ........................ | F16B 7/14 403/109.2 |
| 2015/0211250 A1 * | 7/2015 | Bach | ......................... | F16B 2/18 52/111 |
| 2016/0301128 A1 * | 10/2016 | Blackwelder | .......... | E04H 12/182 |
| 2019/0368216 A1 * | 12/2019 | Young | ..................... | F16B 7/105 |
| 2020/0408235 A1 * | 12/2020 | Moody | .................... | H01Q 1/103 |
| 2023/0108329 A1 * | 4/2023 | Strippoli | .................. | F16B 7/105 52/115 |

* cited by examiner

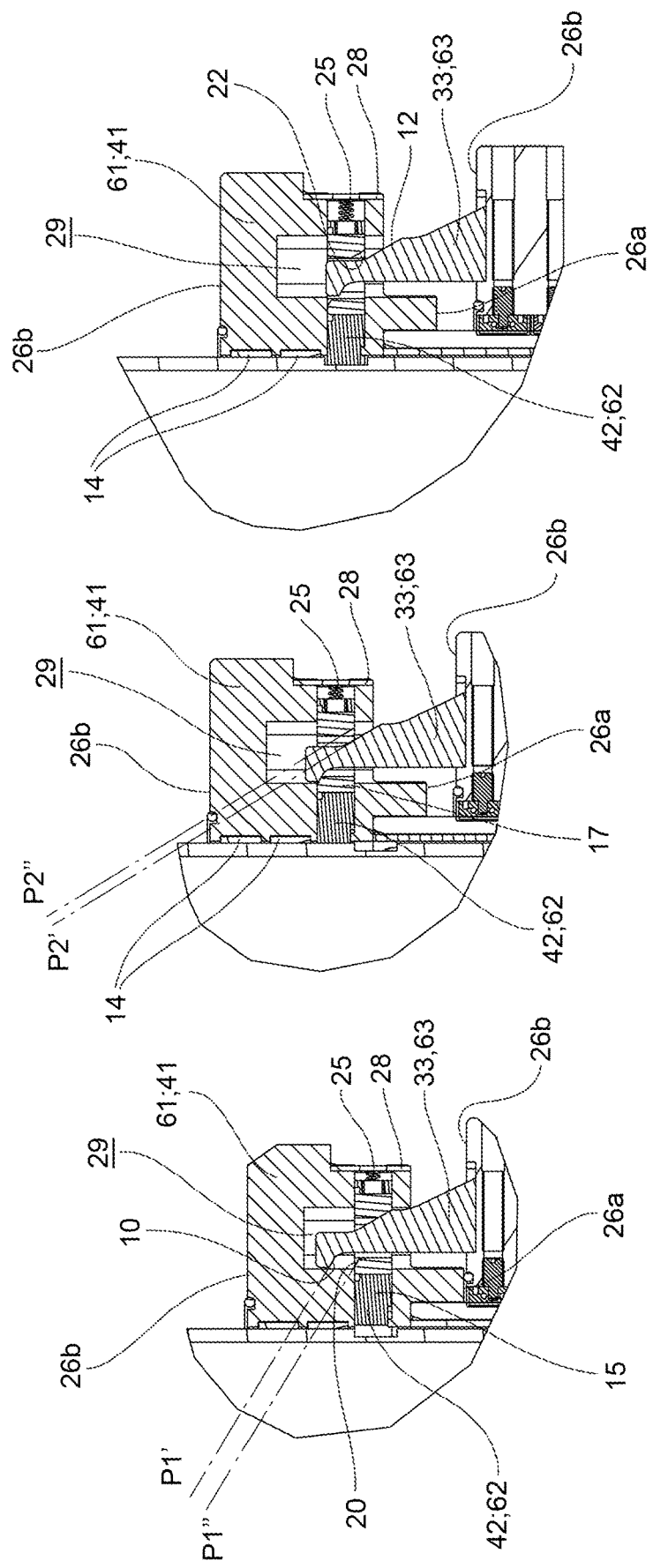

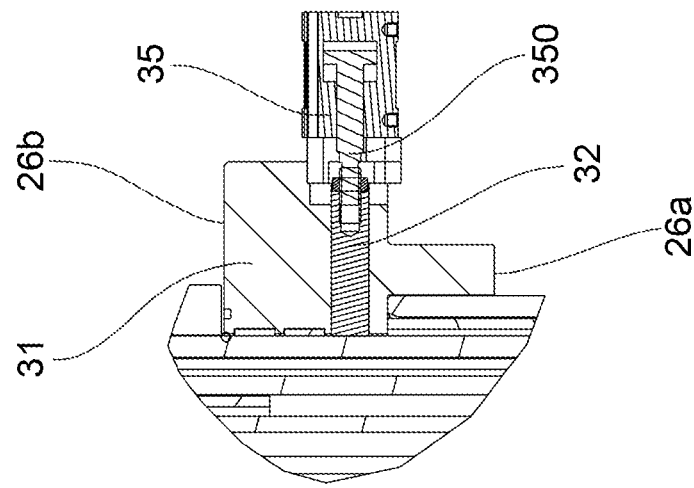
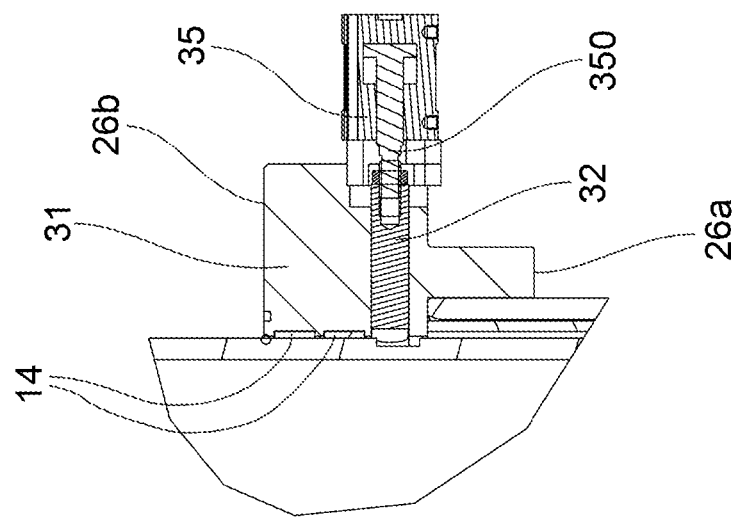
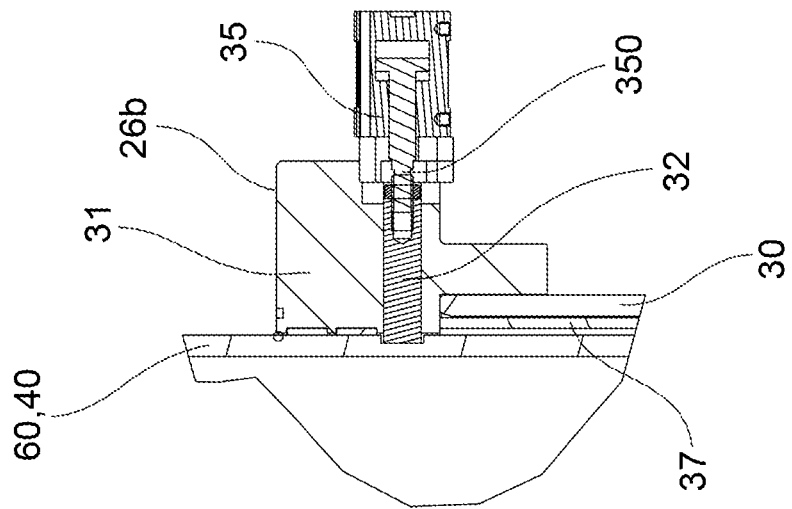

PNEUMATIC TELESCOPIC COLUMN ASSEMBLY

CROSS-REFERENCE TO RELATED APPLICATIONS

This application is a National Phase Application of PCT International Application No. PCT/IB2021/051719, having an International Filing Date of Mar. 2, 2021 which claims priority to Italian Application No. 102020000004345 filed Mar. 2, 2020, each of which is hereby incorporated by reference in its entirety.

FIELD OF THE INVENTION

The present invention relates to the field of telescopic columns. In particular, it is the object of the present invention to provide a pneumatic telescopic column assembly for supporting and moving military equipment, communication equipment, lighting equipment and/or surveillance equipment.

BACKGROUND OF THE INVENTION

In the current art, pneumatic telescopic columns are divided into two types.

The first type relates to manual pneumatic telescopic columns, in which each tubular element is blocked relative to the preceding tubular element of larger diameter manually by an operator present on site. In other words, this type of column requires manual blocking performed by an operator who, by operating a lever blocking system or by mechanical interference, e.g. by friction, constrains each tubular element to the preceding one.

The tubular elements are also known to a person skilled in the art as "stages".

The second type of pneumatic telescopic columns is that of semi-automatic telescopic columns, in which, during the extension movement of the column, each tubular element is automatically blocked to the preceding one, e.g. by a system of handles or levers activated by torsional springs. However, during the step of retracting of the column, the presence of an operator is required to manually release the tubular elements. For example, the operator must open the handles to allow the column to retract, i.e. to move into the configuration in which the tubular elements are concentrically housed within one another.

Both types of pneumatic telescopic columns, whether manual or semi-automatic, do not have a unique extension sequence of the tubular elements. In other words, introducing compressed air inside the column, the telescopic column does not always start extending the same tubular element, but it can change according to how the lubricant is distributed, the mutual friction between the tubular elements or the wear due to sliding. Therefore, there is no mechanical system to ensure a safe and precise extension and retraction sequence of the pneumatic telescopic column.

SUMMARY OF THE INVENTION

It is an object of the present invention to suggest a pneumatic telescopic column assembly capable of avoiding the drawbacks complained of above in relation to pneumatic telescopic columns according to the background art.

In particular, it is an object of the present invention to suggest a fully automatic pneumatic telescopic column assembly having a defined extension and retraction sequence.

Said object is achieved by a pneumatic telescopic column assembly, an extension method and a retraction method as described and claimed herein. Preferred embodiments of the present invention are also described.

BRIEF DESCRIPTION OF THE FIGURES

The features and advantages of the pneumatic telescopic column assembly and of the extension and retraction methods according to the invention will be apparent from the following description which illustrates preferred embodiments, given by way of indicative, non-limiting examples, with reference to the accompanying figures, in which:

FIG. 4 shows a detailed cross-section view of a horizontal intermediate latch in an unblocking position or an auxiliary horizontal intermediate latch in an auxiliary unblocking position;

FIG. 4a shows a detailed cross-section view of the pneumatic telescopic column assembly in a pre-blocking configuration;

FIG. 4b shows a detailed cross-section view of a horizontal intermediate latch in a blocking position or of the auxiliary horizontal intermediate latch in an auxiliary blocking position;

FIG. 5 shows a detailed cross-section view of an actuator in an advanced position;

FIG. 5a shows a detailed cross-section view of the actuator in a retracted position;

FIG. 5b shows a detailed cross-section view of the actuator in an at least partially retracted position;

FIG. 9a shows a top view of the horizontal intermediate latch or the auxiliary horizontal intermediate latch;

FIG. 9b shows a cross-section view of the horizontal intermediate latch or the auxiliary horizontal intermediate latch.

DETAILED DESCRIPTION

Figure 1:
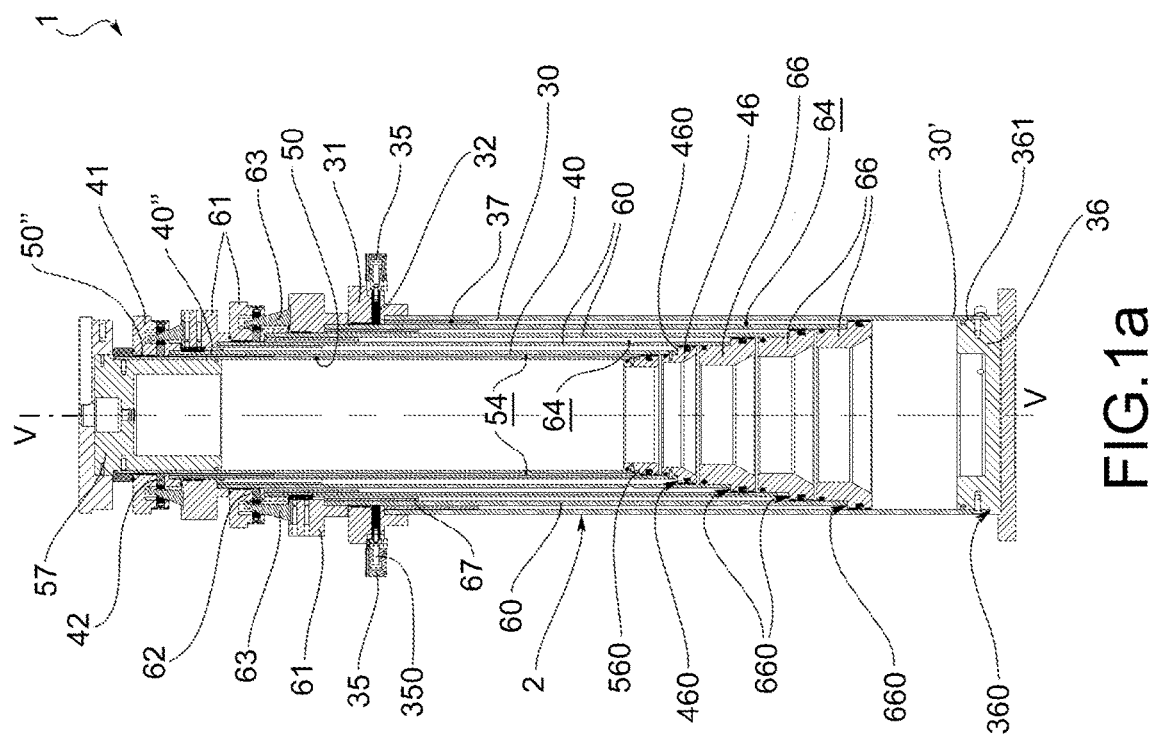
FIG. 1 shows a cross-section of a pneumatic telescopic column assembly in a compact configuration.
Figure 1A:
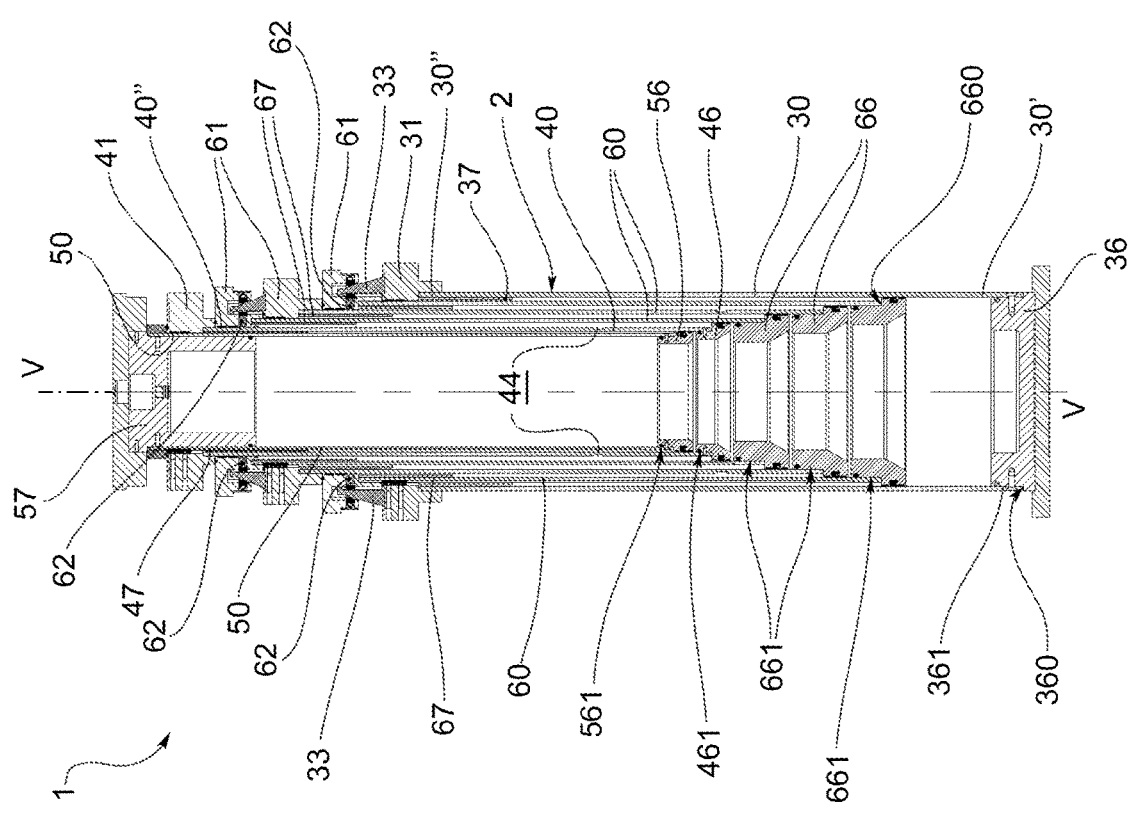
FIG. 1a shows a second cross-section of the pneumatic telescopic column assembly in a compact configuration.
Figure 2:
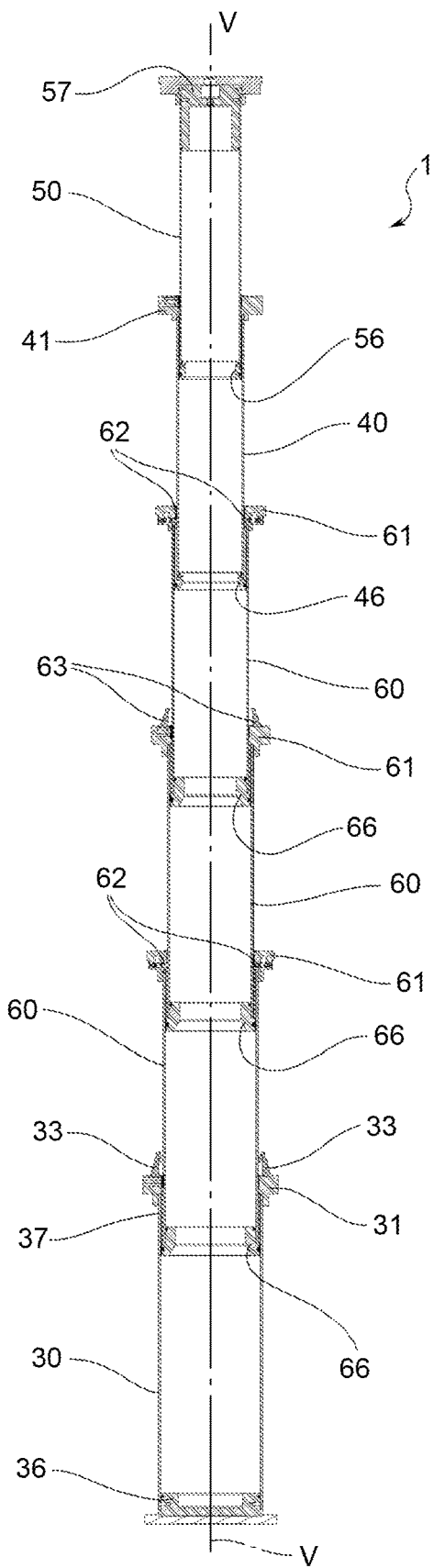
FIG. 2 shows a cross-section of the pneumatic telescopic column assembly in FIG. 1 in an extended configuration.
Figure 2A:
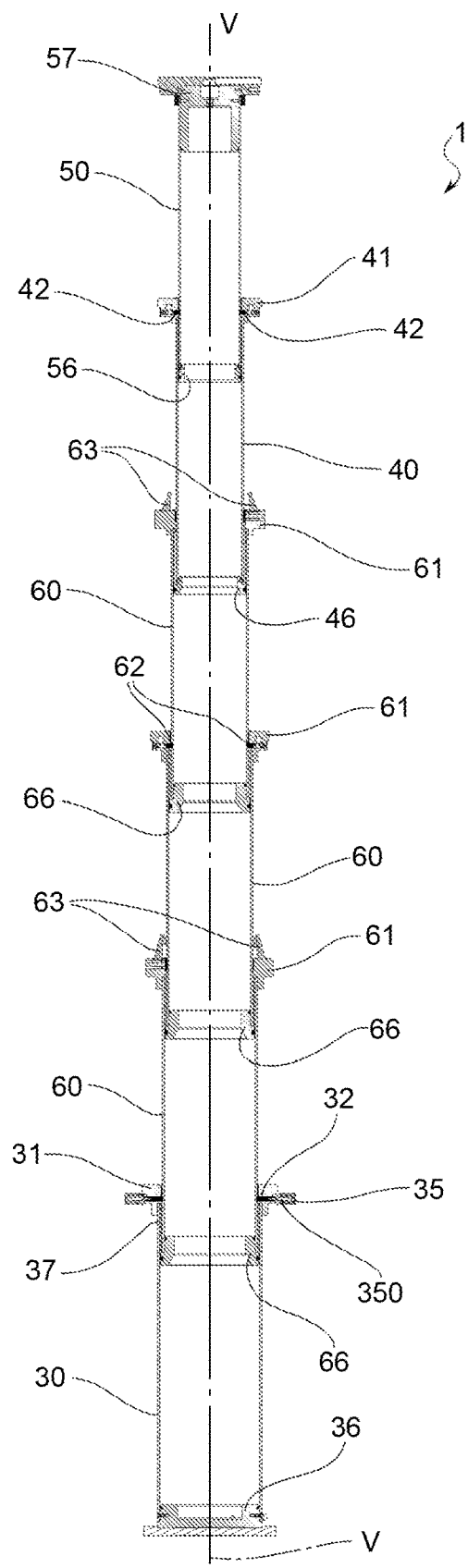
FIG. 2a shows a cross-section of the pneumatic telescopic column assembly in FIG. 1a in an extended configuration.
Figure 3:
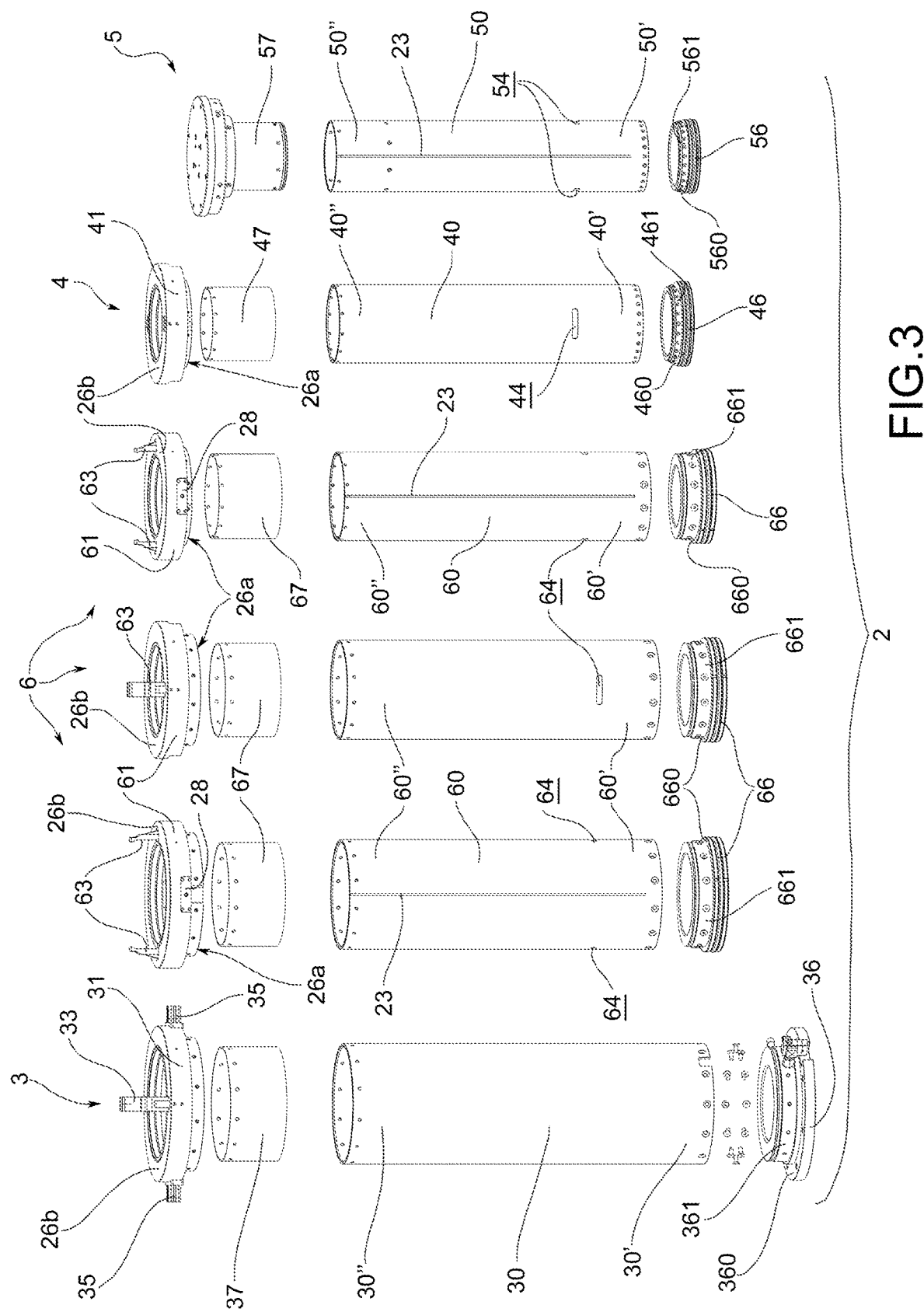
FIG. 3 shows a perspective view of the pneumatic telescopic column assembly with the components separated.
Figure 6:
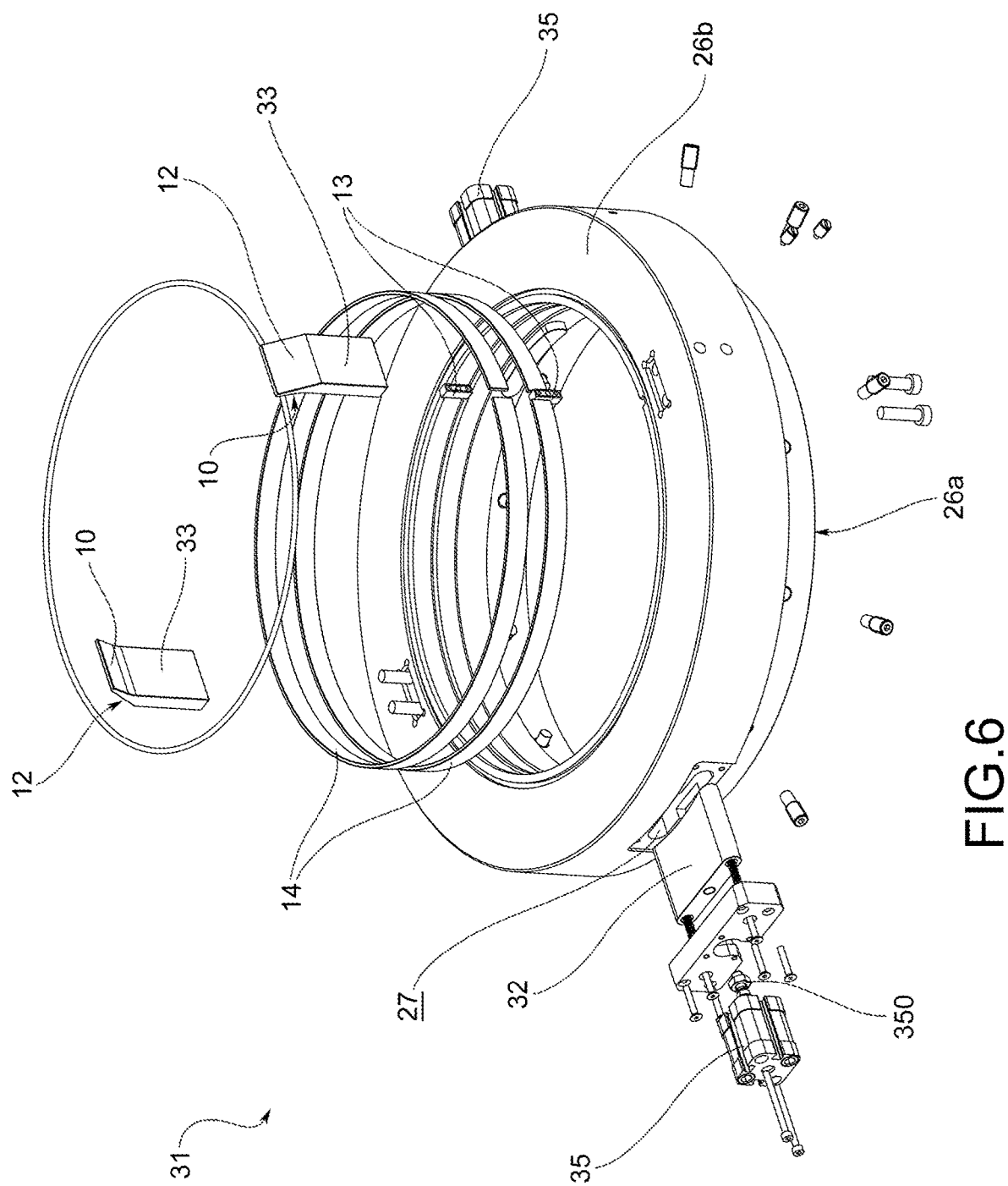
FIG. 6 shows a perspective view of a base locking ring with the components separated.
Figure 7:
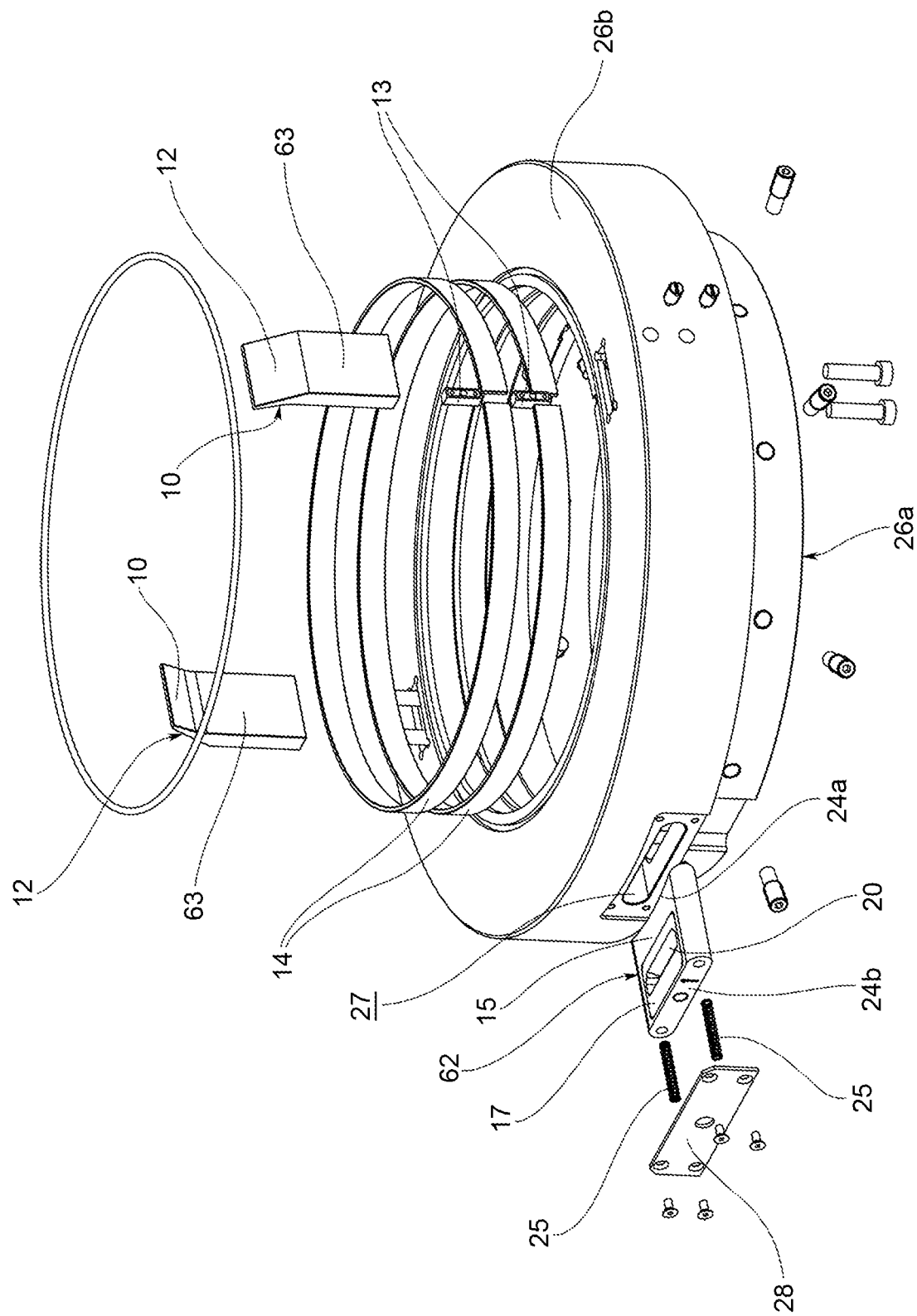
FIG. 7 shows a perspective view of an auxiliary intermediate locking ring with the components separated.
Figure 8:
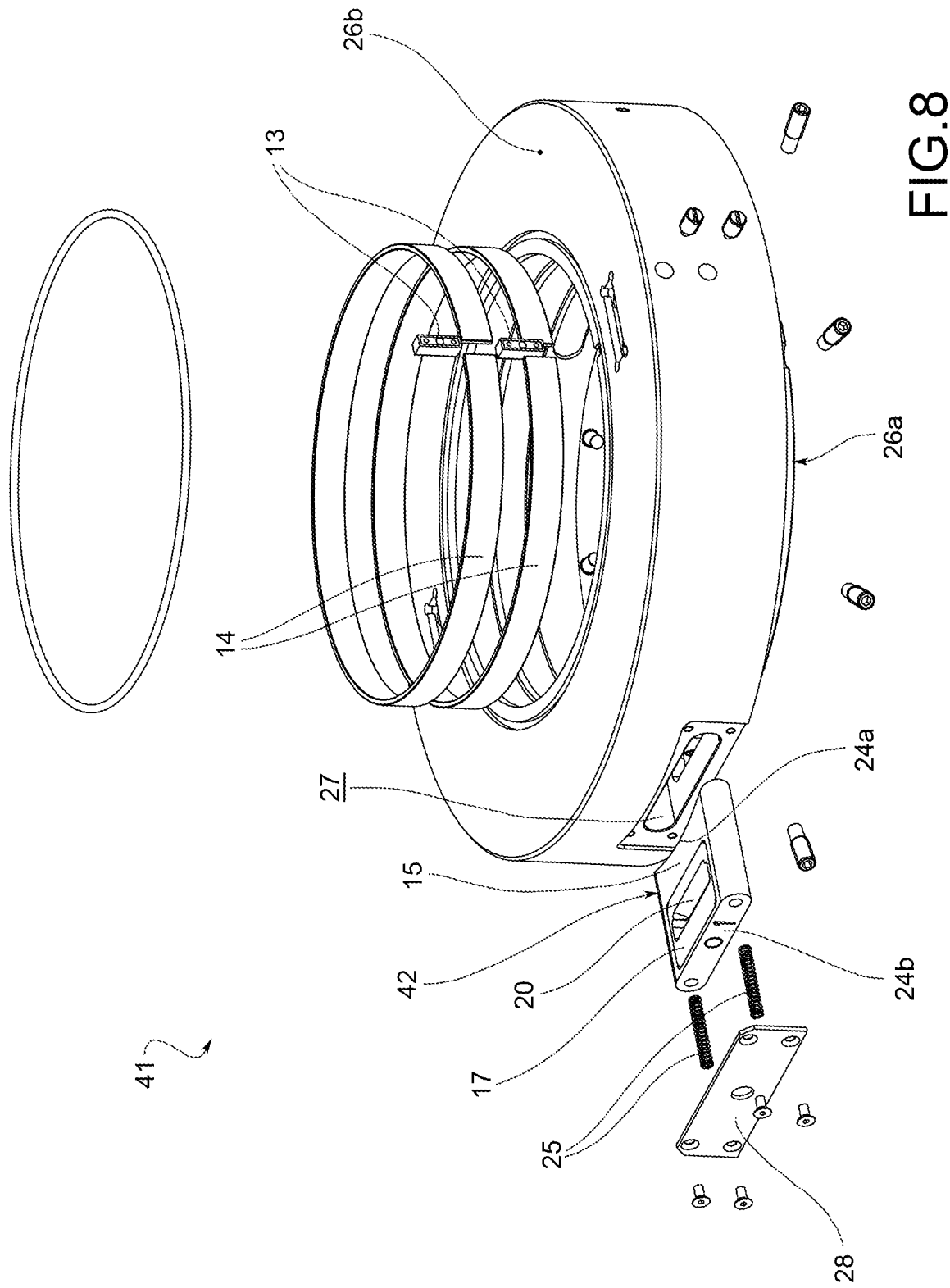
FIG. 8 shows a perspective view of an intermediate locking ring with the components separated.
Figure 9:
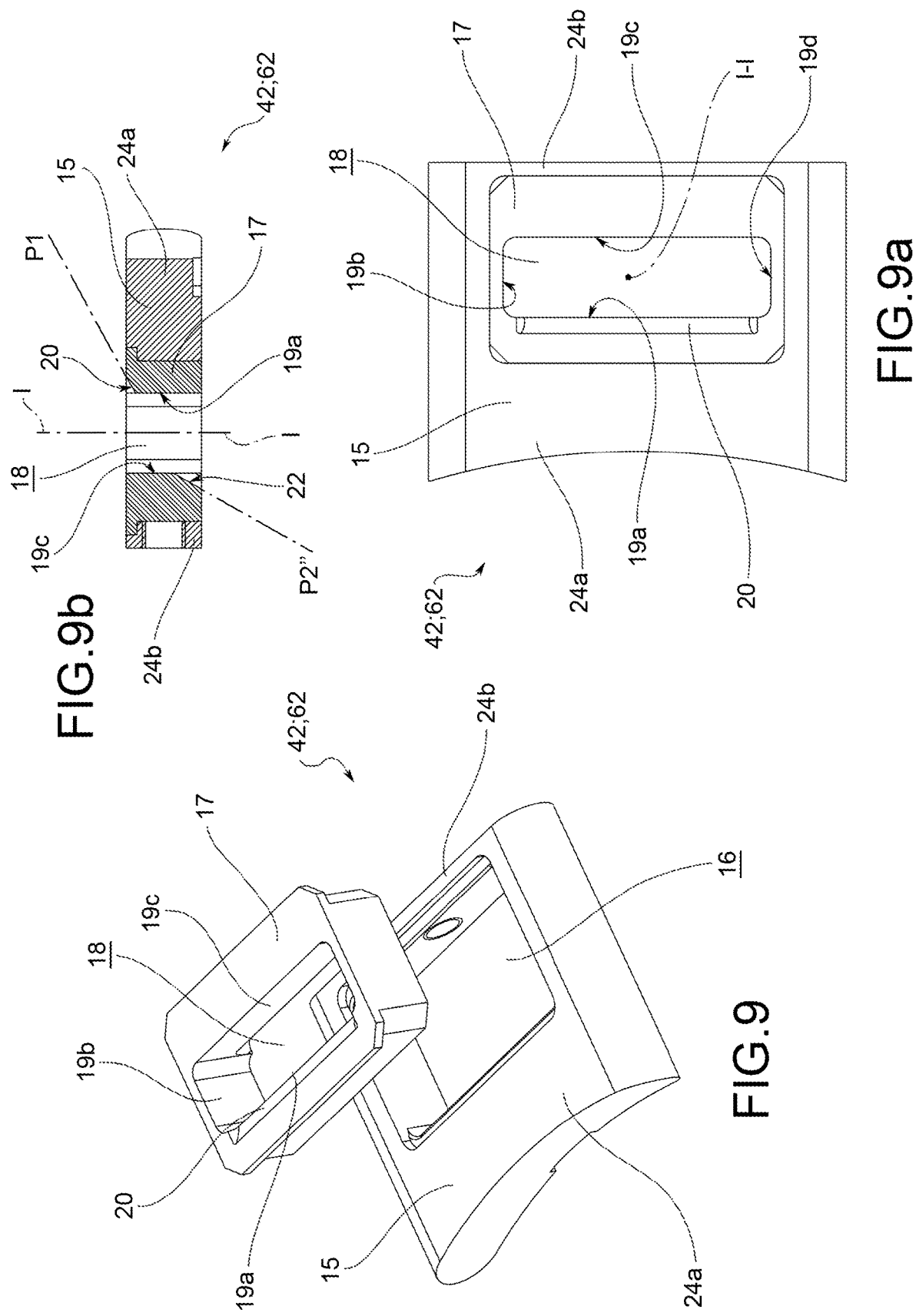
FIG. 9 shows a perspective view of the horizontal intermediate latch or the auxiliary horizontal intermediate latch with the components separated.
Figure 10:
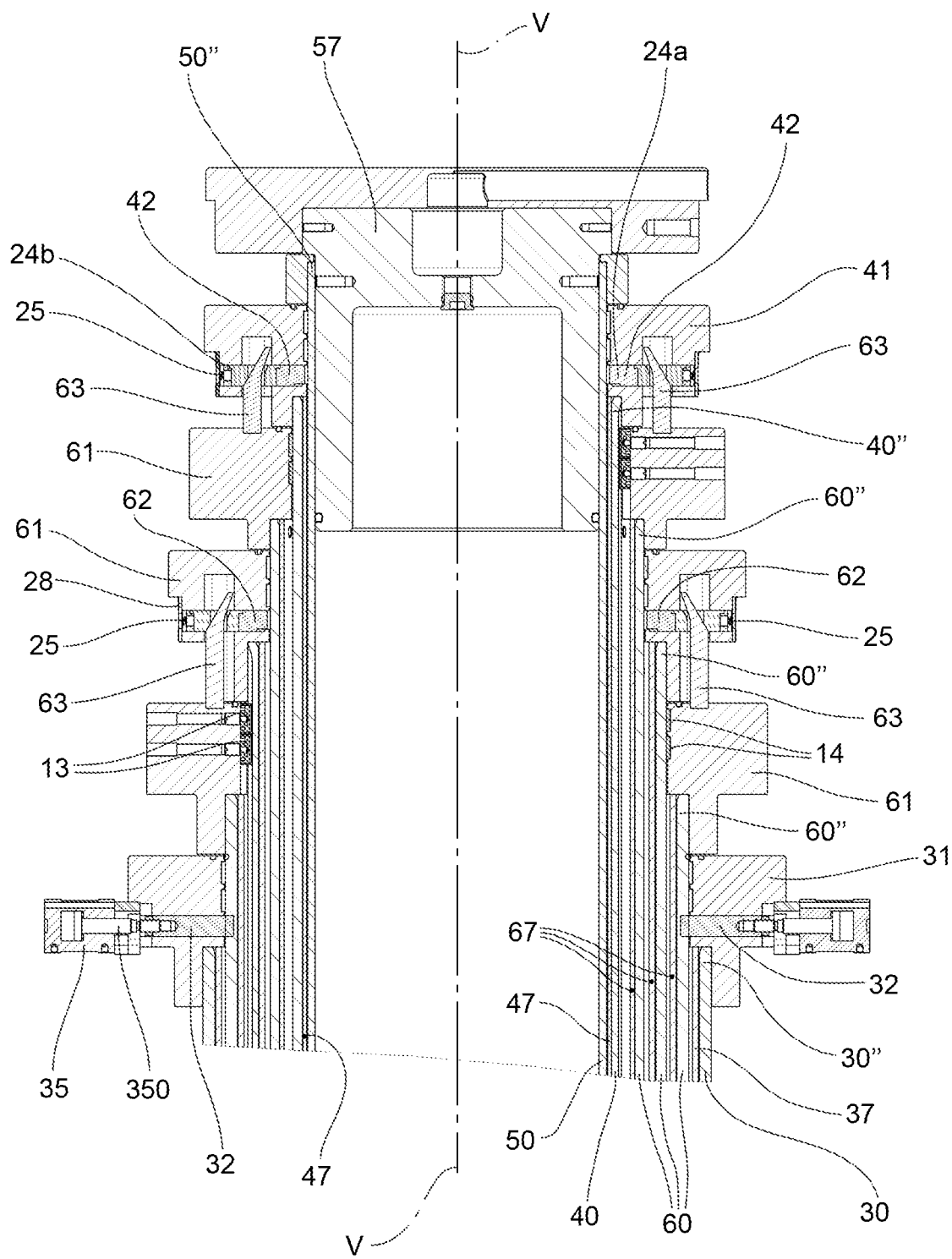
FIG. 10 shows a cross-section view of the pneumatic telescopic column assembly in a compact configuration according to a design variant.

In said drawings, a pneumatic telescopic column assembly according to the invention is indicated by reference numeral 1 as a whole.

In a preferred embodiment, a pneumatic telescopic column assembly 1 is suggested for supporting and moving military equipment, communication equipment, lighting equipment and/or surveillance equipment, which extends along an axis V-V and comprises a plurality of tube groups 2 telescopically configurable along the axis V-V between a compact configuration and an extended configuration, and means for injecting and discharging air, which are suitable to move such a plurality of tube groups 2.

In the compact configuration, the pneumatic telescopic column is completely retracted, while in the extended configuration the column is completely extended along the axis V-V. Intermediate configurations, i.e. partial extension or partial retraction, are also possible between the compact and the extended configuration.

Such a plurality of tube groups 2 comprises a base tube group 3, an intermediate tube group 4 and a head tube group 5.

The base tube group 3 comprises a base tubular element 30 and a base locking ring 31. The base tubular element 30 extends between a base tubular element lower end 30' and a base tubular element upper end 30". The base locking ring 31 is fixed to the base tubular element upper end 30" and comprises at least one horizontal latch 32, at least one actuator 35 and at least one vertical latch 33. The actuator 35 comprises a stem 350 orthogonal to the axis V-V and integrally connected to the at least one horizontal latch 32. The horizontal latch 32 and the vertical latch 33 are angularly spaced. For example, the horizontal latch 32 and the vertical latch 33 are arranged in the base locking ring 31 at 90 degrees from each other.

The intermediate tube group 4 comprises an intermediate tubular element 40 and an intermediate locking ring 41. The intermediate tubular element 40 extends between an intermediate tubular element lower end 40' and an intermediate tubular element upper end 40". The intermediate locking ring 41 is fixed to the intermediate tubular element upper end 40" and comprises at least one horizontal intermediate latch 42 axially aligned with the vertical latch 33 and engageable by said vertical latch 33. In other words, in the pneumatic telescopic column assembly, it can be observed that the horizontal intermediate latch 42 is positioned above the vertical latch 33 along the axis V-V. In detail, the horizontal intermediate latch 42 is orthogonal to the axis V-V, while the vertical latch 33 is parallel to the axis V-V.

For the purposes of the present discussion, the adjective "horizontal" means an element arranged orthogonally to the axis V-V, and the adjective "vertical" means an element arranged parallel to the axis V-V.

In the preferred embodiment, the tube head group 5 comprises a head tubular element 50, which extends between a head tubular element lower end 50' and an upper tubular head element end 50".

In the movement between the compact configuration and the extended configuration, the horizontal intermediate latch 42 translates horizontally between an unblocking position and a blocking position. In the unblocking position, the head tubular element 50 is disengaged from the intermediate tubular element 40 and the vertical latch 33 engages the horizontal intermediate latch 42. In particular, when the head tubular element 50 is disengaged from the intermediate tubular element 40, it is understood that the head tubular element 50 is sliding and axially free relative to the intermediate tubular element 40. In the blocking position, the head tubular element 50 is engaged to the intermediate tubular element 40 and the intermediate horizontal latch 42 engages a horizontal intermediate latch seat 54 obtained in the head tubular element 50. The actuator 35 is actuated between a retracted position and an advanced position. In the retracted position, the intermediate tubular element 40 slides along the axis V-V. In the advanced position, the horizontal latch 32 integral with the stem 350 engages a horizontal latch seat 44 obtained in the intermediate tubular element 40 and blocks the extension of the intermediate tubular element 40 relative to the base tubular element 30.

According to an embodiment, the pneumatic telescopic column assembly 1 further comprises at least one auxiliary intermediate tube group 6 arranged between the base tube group 3 and the intermediate tube group 4. Such an auxiliary intermediate tubular group 6 comprises an auxiliary intermediate tubular element 60 and an intermediate locking ring 61. The auxiliary intermediate tubular element 60 extends between an auxiliary intermediate tubular element lower end 60' and an auxiliary intermediate tubular element upper end 60". The auxiliary intermediate locking ring 61 is attached to the auxiliary intermediate tubular element upper end 60" and comprises at least one auxiliary horizontal intermediate latch 62 and at least one auxiliary vertical intermediate latch 63. The at least one auxiliary horizontal intermediate latch 62 is axially aligned with the vertical latch 33 and is engageable by said vertical latch 33. The at least one auxiliary vertical intermediate latch 63 is axially aligned with and is engageable by the horizontal intermediate latch 42. The auxiliary horizontal intermediate latch 62 and the auxiliary vertical intermediate latch 63 are angularly spaced, e.g. are arranged mutually at 90 degrees.

In the movement between the compact configuration and the extended configuration, the horizontal intermediate latch 42 translates horizontally between an unblocking position and a blocking position. In the unblocking position, the head tubular element 50 is disengaged from the intermediate tubular element 40 and the auxiliary vertical intermediate latch 63 engages the horizontal intermediate latch 42. In the blocking position, the head tubular element 50 is engaged to the intermediate tubular element 40 and the horizontal intermediate latch 42 engages the horizontal intermediate latch seat 54 obtained in the head tubular element 50. In particular, in the blocking position, the auxiliary vertical intermediate latch 63 is disengaged from the horizontal intermediate latch 42. The auxiliary horizontal intermediate latch 62 translates horizontally between an auxiliary unblocking position and an auxiliary blocking position. In the auxiliary unblocking position, the intermediate tubular element 40 is disengaged from the auxiliary intermediate tubular element 60 and the vertical latch 33 engages the auxiliary horizontal intermediate latch 62. In the auxiliary blocking position, the intermediate tubular element 40 is engaged to the auxiliary intermediate tubular element 60 and the auxiliary horizontal intermediate latch 62 engages the horizontal latch seat 44 obtained in the intermediate tubular element 40. In particular, in the auxiliary blocking position, the vertical latch 33 is disengaged from the auxiliary horizontal intermediate latch 62. The actuator 35 is actuated between a retracted position and an advanced position. In the retracted position, the auxiliary intermediate tubular element 60 slides along the axis V-V. In the advanced position, the horizontal latch 32 integral with the stem 350 engages a latch seat 64 made in the auxiliary intermediate tubular element 60 and blocks the extension of the auxiliary intermediate tubular element 60 relative to the base tubular element 30.

For the purposes of the present discussion, the generic expression "tube group" refers to any tube group of the plurality of tube groups 2. In other words, the expression "tube group" generically indicates either the base tube group 3, or the auxiliary intermediate tube group 6, the intermediate tube group 4, or the head tube group 5.

In the present description, the term "tubular element" generically refers to either the base tubular element 30, or the auxiliary intermediate tubular element 60, or the intermediate tubular element 40, or the head tubular element 50.

For the purposes of the present description, the term "locking ring" generically refers to the base locking ring 31, or the auxiliary intermediate locking ring 61 or the intermediate locking ring 41.

In an embodiment, the pneumatic telescopic column assembly 1 comprises at least two auxiliary intermediate tube groups 6 arranged in succession, so that the auxiliary vertical intermediate latch 63 of the auxiliary intermediate locking ring 61 following the base tube group 3 is vertically aligned with and engageable to the auxiliary horizontal intermediate latch 62 of the successive auxiliary intermediate locking ring 61. In other words, the auxiliary vertical intermediate latch 63 of the auxiliary intermediate locking ring 61 of the auxiliary intermediate tube group 6 proximal to the base tube group 3 is vertically aligned with and engageable to the auxiliary horizontal intermediate latch 62 of the auxiliary intermediate locking ring 61 of the successive auxiliary intermediate tube group 6.

In the present description, the term "successive" means the tubular element having a diameter immediately smaller than the considered one, and the term "preceding" means the tubular element having a diameter immediately larger than the considered one. Therefore, the base tubular element, since it concentrically contains all the successive tubular elements within it, with gradually decreasing diameters, must be considered the preceding tubular element in an absolute sense, i.e. preceding the auxiliary intermediate tubular element, the intermediate tubular element and the head tubular element.

On the other hand, the head tubular element, since it is concentrically contained within all the preceding tubular elements, with gradually increasing diameters, must be considered the successive tubular element in an absolute sense, i.e. successive to the tubular base element, the auxiliary intermediate tubular element and the intermediate tubular element. In other words, the base tubular element precedes the at least one auxiliary intermediate tubular element that precedes the head tubular element. Conversely, the head tubular element is successive to the intermediate tubular element which is successive to the at least one auxiliary intermediate tubular element which is successive to the tubular base element.

According to an embodiment, the vertical latch 33 and the auxiliary vertical intermediate latch 63 respectively comprise a first guide surface 10 and a second guide surface 12, which are respectively engageable with a first counter-guide surface 20 and a second counter-guide surface 22 obtained on the auxiliary horizontal intermediate latch 62 and the horizontal intermediate latch 42. Such first guide surface 10 and first counter-guide surface 20 lie on a pair of first parallel planes P1', P1", which are different from a pair of second parallel planes P2', P2" on which the second guide surface 12 and the second counter-guide surface 22 lie. The mutual sliding between the first guide surface 10 and the respective first counter-guide surface 20 moves the auxiliary horizontal intermediate latch 62 into the auxiliary blocking position and/or the horizontal intermediate latch 42 into the blocking position. Instead, the mutual sliding between the second guide surface 12 and the respective second counter-guide surface 22 moves the auxiliary horizontal intermediate latch 62 into the auxiliary blocking position and/or the horizontal intermediate latch 42 into the unblocking position.

When the pneumatic telescopic column assembly 1 is in a compact configuration, an upper surface 26b of the locking ring 31; 61; 41 is in contact with a lower surface 26a of the successive locking ring. Upon insertion of compressed air within the column, the locking rings axially separate along the axis V-V, the vertical latch 33 and the auxiliary vertical intermediate latch 63 engage the auxiliary horizontal intermediate latch 62 and the horizontal intermediate latch 42, respectively, so that the column is in an axial pre-blocking configuration. This pre-blocking configuration guarantees a regular extension of the column, because as the hydrostatic pressure increases inside the column, the tube group with the smallest diameter begins to extend, i.e. the head tube group 5, and then all the previous tube groups up to the auxiliary intermediate group 6 with a diameter immediately smaller than that of the base tube group 3 which is fixed.

Similarly, when it is desired to retract the pneumatic telescopic column assembly 1 and take it from the extended configuration to the compact configuration, the hydrostatic pressure within it is reduced and the larger diameter tubular element is retracted first, excluding the base tubular element 30, which is fixed. Therefore, the auxiliary intermediate locking ring 61 applies a greater force on the fluid inside the column than the successive locking rings, so the intermediate auxiliary tubular element 60 is the first to close inside the base tubular element 30. This is followed by the retraction of the successive tubular elements until the head tubular element 50, which is the last tubular element to close.

In pneumatic telescopic columns according to the background art, a phenomenon known in jargon to the person skilled in the art as "bounce" is observed. Such a phenomenon occurs during the closing of the telescopic column, i.e. during the retraction of the tubular elements in the compact configuration. Due to the reduction of pressure inside the column, the tube groups with the smaller diameters, e.g. the intermediate tube group 4 and the head tube group 5, do not retract continuously after the retraction of the preceding tubular elements, but a vacuum must be created inside the column before they close again. Because of this vacuum, the tube group following the one already closed drops rapidly and causes an increase in hydrostatic pressure inside the column. Such a sudden increase causes an overpressure inside the column which, in addition to the retraction of the tube group in the step of closing, also causes the simultaneous rising of the preceding tube unit. The effect of the opposite and simultaneous motion of the two tube groups arranged in succession causes a repeated collision of the upper surface 26b of the preceding locking ring with the lower surface 26a of the successive locking ring until the successive tube element is completely retracted. From such a repeated collision between the upper surface 26b of the already retracted tube group that is rising and the lower surface 26a of the tube group that is being retracted, a sort of "rebound" between the two locking rings arranged in succession is observed. This rebound effect is reminiscent of the movement of a bouncing ball, hence the name "bouncing".

On the other hand, in the pneumatic telescopic column assembly 1 according to an embodiment of the present invention, during the closing of the column, i.e. during the retraction of the tube groups, when a tube group is closed it goes into the axial pre-blocking configuration, therefore it cannot rise when, due to the effect of the rapid retraction of the successive tube group due to the depression inside the column, an overpressure is created which would cause the preceding tube group to rise if it were not pre-blocked.

Advantageously, the pneumatic telescopic column assembly solves the "bounce" problem.

According to an embodiment, the mutual static engagement between the first guide surface 10 and the respective first counter-guide surface 20 defines a pre-blocking configuration between two successive tube groups (FIG. 4a). In the pre-blocking conditions, during the movement of the column between the compact configuration and the extended configuration, the auxiliary horizontal intermediate latch 62 and/or the horizontal intermediate latch 42 freely slide on the outer wall of the tubular element of the successive tube group. In the pre-blocking configuration, during the movement of the column assembly between the extended configuration and the compact configuration, the axial movement of the preceding tubular element is blocked. In other words, during the movement of the column assembly between the extended configuration and the compact configuration, the rising movement of the preceding tubular element is prevented by the engagement between the first guide surface 10 and the respective first counter-guide surface 20.

According to an embodiment, the auxiliary horizontal intermediate latch 62 and the horizontal intermediate latch 42 each comprise a latch frame 15 and a latch insert 17. A frame through-hole 16 is made in the latch frame 15. The latch insert 17 can be housed in the frame through-hole 16 by shape and/or force coupling. An insert through-hole 18 also being obtained in the latch insert 17, which insert through-hole is delimited by four mutually orthogonal walls 19a, 19b, 19c, 19d, wherein two walls 19a, 19c facing one another are shaped to form the first counter-guide surface 20 and the second counter-guide surface 22. The insert through-hole 18 extends along an insert hole axis I-I, which is substantially parallel to the axis V-V, and which can be engaged by the vertical latch 33 and/or the auxiliary vertical intermediate latch 63.

In an embodiment, the auxiliary horizontal intermediate latch 62 and the horizontal intermediate latch 42 extend between a tubular element engagement end 24a and a ring engagement end 24b. The tubular element engagement end 24a slides on the tubular element 60; 40; 50 of an outer wall and is engageable either in the latch seat 64, or in the horizontal latch seat 44, or in the horizontal intermediate latch seat 54. The ring engagement end 24b is engageable by a locking ring 61; 41 by means of a pre-compressed elastic element 25, e.g. a coil spring, which promotes translation of the auxiliary horizontal intermediate latch 62 into the auxiliary blocking position or translation of the horizontal intermediate latch 42 into the blocking position.

In an embodiment, each locking ring 31; 41; 61 is provided with a horizontal latch housing hole 27 of the through type and suitable to house the horizontal latch 32, or the auxiliary horizontal intermediate latch 62, or the horizontal intermediate latch 42. The locking ring 31; 41; 61 further comprises a contact plate 28 suitable to close an opening of the horizontal latch housing hole 27 so that the pre-compressed elastic element 25 is arranged between the ring engagement end 24b and the contact plate 28.

According to an embodiment, the intermediate auxiliary locking ring 61 and the intermediate locking ring 41 are further each provided with a vertical latch housing hole 29, which is blind and is respectively suitable to house the vertical latch 33 and the auxiliary intermediate vertical latch 63. Observing the auxiliary intermediate locking ring 61 or the intermediate locking ring 41 in cross-section, it can be seen that the horizontal latch housing hole 27 and the vertical latch housing hole 29 intersect to form a cross.

According to an embodiment, the actuator 35 is a single-acting actuator in which the stem 350 is normally extended in an advancement position.

According to an embodiment, each tube group 3; 4; 5; 6 further comprises a piston 36; 46; 56; 66, which is provided with a piston step 360; 460; 560; 660 and a piston lift 361; 461; 561; 661. The piston step 360; 460; 560; 660 is suitable to abut a lower end 30'; 40'; 50'; 60' of a tubular element 30; 40; 50; 60. The piston lift 361; 461; 561; 661 is suitable to fix the tubular element 30; 40; 50; 60 to the piston 36; 46; 56; 66.

According to an embodiment, the tube group 3; 4; 6 further comprises an end stop 37; 47; 67 internally fixed to an upper end 30"; 40"; 60" of the tubular element 30; 40; 60 to define the maximum excursion of the successive tube group.

In an embodiment, the base tube group 3 further comprises an annular support base 36 and a tubular end stop 37.

The annular support base 36 is provided with a step 360 for abutting the lower end of base tubular element 30', and a lift 361 for fixing the base tubular element 30 to the annular support base 36. The tubular end stop 37 is internally fixed to the base tubular element upper end 30" to define the maximum excursion of the at least one auxiliary intermediate tube group 6.

The auxiliary intermediate tube group 6 further comprises an auxiliary piston 66 and an auxiliary tube end stop 67. The auxiliary piston 66 is suitable to slide on the inner wall of the base tubular element 30 and is provided with an auxiliary piston step 660 for abutting the auxiliary intermediate tubular element lower end 60' and for abutting the tubular end stop 37, and an auxiliary piston lift 661 for fixing the auxiliary intermediate tubular element 60 to the auxiliary piston 66. The auxiliary tube end stop 67 is internally fixed to the auxiliary intermediate tube element upper end 60 to define the maximum excursion of a successive auxiliary intermediate tube group 6 or intermediate tube group 4.

The intermediate tube group 4 further comprises an intermediate piston 46 and an intermediate tube end stop 47. The intermediate piston 46 is suitable to slide on the inner wall of the auxiliary intermediate tubular element 60 and is provided with an auxiliary intermediate piston step 460 for abutting the lower end of intermediate tubular element 40' and for abutting the auxiliary tubular end stop 67, and an intermediate piston lift 461 for fixing the intermediate tubular element 40 to the intermediate piston 46. The intermediate tubular end stop 47 is internally fixed to the intermediate tubular element upper end 40 to define the maximum excursion of the head tube group 5.

The head group 5 further comprises a head piston 56 and an equipment installation frame 57. The head piston 56 is suitable to slide on the inner wall of the intermediate tubular element 40 and is provided with a head piston step 560 for abutting the lower end of the head tubular element 50' and for abutting the intermediate tubular end stop 67, and a head piston lift 561 for fixing the head tubular element 50 to the head piston 56. The equipment installation frame 57 is fixed to the upper tubular head element end 50" for supporting and moving military equipment, communication equipment, lighting equipment and/or surveillance equipment.

According to an embodiment, each locking ring 31; 61; 41 comprises at least one anti-rotation tab 13 slidingly and axially engaged in a guide 23 respectively made in the outer wall of the successive tubular element 60; 40; 50.

In an embodiment, each locking ring 31; 61; 41 comprises at least one annular band 14 that is made of polymeric material and is suitable to facilitate the sliding motion of the locking ring 31; 61; 41 on the outer wall of the successive tubular element 60; 40; 50. In other words, such an annular band 14 is suitable to facilitate the sliding of the outer wall of the auxiliary intermediate tubular element 60 on the base locking ring 31 and/or of the outer wall of the intermediate tubular element 40 on the base locking ring 31 or on the auxiliary intermediate locking ring 61 and/or of the outer wall of the head tubular element 50 on the intermediate locking ring 41.

According to a preferred embodiment, the extension operation of a pneumatic telescopic column assembly 1 comprises the following steps:
injecting compressed air by means of the means for injecting and discharging air;
placing the pneumatic telescopic column assembly 1 in the pre-blocked configuration, in which a first guide surface 10 engages in a particular first counter-guide surface 20;
extending the head tube group 5;
disengaging the vertical latch 33 from the horizontal intermediate latch 42 at the maximum degree of extension of the head tube group 5 such that the horizontal intermediate latch 42 moves into the blocking position, in which the head tubular element 50 is engaged and axially blocked to the intermediate tubular element 40 and the horizontal intermediate latch 42 engages in the horizontal intermediate latch seat 54 obtained in the head tubular element 50;
extending the intermediate tube group 4;
translating the actuator 35 into the advanced position at the maximum degree of extension of the intermediate tube group 4, in which the horizontal latch 32 engages in the horizontal latch seat 44 made in the intermediate tubular element 40 and blocks the axial extension of the intermediate tubular element 40 with respect to the tubular base element 30.

According to an embodiment, the extension method of a pneumatic telescopic column assembly 1 further comprises the following steps:
disengaging the auxiliary vertical intermediate latch 63 from the horizontal intermediate latch 42 at the maximum degree of extension of the head tube group 5 so that the horizontal intermediate latch 42 translates into the blocking position, in which the head tubular element 50 is engaged and axially blocked to the intermediate tubular element 40 and the horizontal intermediate latch 42 engages in the horizontal intermediate latch seat 54 made in the head tubular element 50;
extending the intermediate tube group 4;
disengaging the vertical latch 33 from the auxiliary horizontal intermediate latch 62 at the maximum extension of the intermediate tube group 4 such that the horizontal auxiliary intermediate latch 62 moves into the auxiliary blocking position, in which the intermediate tubular element 40 is engaged and axially blocked to the auxiliary intermediate tubular element 60 and the horizontal auxiliary intermediate latch 62 engages in the horizontal latch seat 44 made in the intermediate tubular element 40;
extending the auxiliary intermediate tube group 6;
translating the actuator 35 into the advancement position, in which the horizontal latch 32 engages in the latch seat 64 made in the auxiliary intermediate tubular element 60 and blocks the axial extension of the auxiliary intermediate tubular element 60 relative to the tubular base element 30.

In an embodiment, the extension operation of a pneumatic telescopic column assembly 1 comprises the following steps:
injecting compressed air by means of the means for injecting and discharging air;
extending the head tube group 5;
disengaging the auxiliary vertical intermediate latch 63 from the horizontal intermediate latch 42 at the maximum degree of extension of the head tube group 5 so that the horizontal intermediate latch 42 translates into the blocking position, in which the head tubular element 50 is engaged and axially blocked to the intermediate tubular element 40 and the horizontal intermediate latch 42 engages in the horizontal intermediate latch seat 54 made in the head tubular element 50;
extending the intermediate tube group 4;
disengaging the vertical latch 33 from the auxiliary horizontal intermediate latch 62 at the maximum extension of the intermediate tube group 4 such that the horizontal auxiliary intermediate latch 62 moves into the auxiliary blocking position, in which the intermediate tubular element 40 is engaged and axially blocked to the auxiliary intermediate tubular element 60 and the horizontal auxiliary intermediate latch 62 engages in the horizontal latch seat 44 made in the intermediate tubular element 40;
extending the auxiliary intermediate tube group 6;
translating the actuator 35 into the advancement position, in which the horizontal latch 32 integral with the stem 350 engages the latch seat 64 obtained in the auxiliary intermediate tubular element 60 and blocks the axial extension of the auxiliary intermediate tubular element 60 relative to the tubular base element 30.

According to a preferred embodiment, the retraction operation of a pneumatic telescopic column assembly 1 comprises the following steps:
discharging compressed air into the environment by means of the means for injecting and discharging air;
translating the actuator 35 into the retracted position to disengage the horizontal latch 32 from the horizontal latch seat 44 made in the intermediate tubular element 40 and to unblock the axial sliding motion of the intermediate tubular element 40;
retracting the intermediate tube group 4;
engaging a first guide surface 10 of the vertical latch 33 with a respective first counter-guide surface 20 of the horizontal intermediate latch 42 to cause the translation of the horizontal intermediate latch 42 into the unblocking position, in which the head tubular element 50 is disengaged from the intermediate tubular element 40 and the horizontal intermediate latch 42 is disengaged from the horizontal intermediate latch seat 54 made in the head tubular element 50;
retracting the head tube group 5 to place the pneumatic telescopic column assembly 1 in the pre-blocked configuration;
retracting the column assembly into the compact configuration.

According to an embodiment, the retraction operation of the pneumatic telescopic column assembly 1 further comprises the following steps:
translating the actuator 35 into the retracted position to disengage the horizontal latch 32 from the latch seat 64 made in the auxiliary intermediate tubular element 60 and to unblock the axial sliding motion of the auxiliary intermediate tubular element 60;
retracting the auxiliary intermediate tube group 6;

engaging the first guide surface 10 of the vertical latch 33 with the respective first counter-guide surface 20 of the auxiliary horizontal intermediate latch 62 to cause the translation of the auxiliary horizontal intermediate latch 62 into the auxiliary unblocking position, in which the intermediate tubular element 40 is disengaged from the auxiliary intermediate tubular element 60 and the auxiliary horizontal intermediate latch 62 is disengaged from the horizontal latch seat 44 made in the intermediate tubular element 40;

retracting the intermediate tube group 4;

engaging the first guide surface 10 of the auxiliary vertical intermediate latch 63 with the respective first counter-guide surface 20 of the horizontal intermediate latch 42 to cause the translation of the horizontal intermediate latch 42 into the unblocking position, in which the head tubular element 50 is disengaged from the intermediate tubular element 40 and the horizontal intermediate latch 42 is disengaged from the horizontal intermediate latch seat 54 made in the head tubular element 50.

According to an embodiment, the retraction operation of a pneumatic telescopic column assembly 1 comprises the following steps:

discharging compressed air into the environment by means of the means for injecting and discharging air;

translating the actuator 35 into the retracted position to disengage the horizontal latch 32 from the latch seat 64 made in the auxiliary intermediate tubular element 60 and to unblock the axial sliding motion of the auxiliary intermediate tubular element 60;

retracting the auxiliary intermediate tube group 6;

engaging the vertical latch 33 with the horizontal auxiliary intermediate latch 62 to cause the translation of the auxiliary horizontal intermediate latch 62 into the auxiliary unblocking position, in which the intermediate tubular element 40 is disengaged from the auxiliary intermediate tubular element 60 and the horizontal auxiliary intermediate latch 62 is disengaged from the horizontal latch seat 44 made in the intermediate tubular element 40;

retracting the intermediate tube group 4;

engaging the auxiliary vertical intermediate latch 63 with the horizontal intermediate latch 42 to cause the translation of the horizontal intermediate latch 42 into the unblocking position, in which the head tubular element 50 is disengaged from the intermediate tubular element 40 and the horizontal intermediate latch 42 is disengaged from the horizontal intermediate latch seat 54 obtained in the head tubular element 50;

retracting the head tube group 5.

Innovatively, the pneumatic telescopic column assembly fulfills its purpose.

Advantageously, the pneumatic telescopic column assembly is safe because it solves the "bounce" problem.

According to an advantageous aspect, the pneumatic telescopic column assembly always extends and closes in the same manner.

In an even further advantageous aspect, the pneumatic telescopic column assembly is fully automatic and does not require the presence of an operator on site.

Advantageously, the pneumatic telescopic column assembly allows easy maintenance operations; indeed, the latch insert, by shape and/or force coupling in the latch frame, can be easily replaced. Such an easy replacement is advantageous because the latch insert is the most easily worn part because it is subject to sliding and engagement with the vertical latch and/or the auxiliary vertical intermediate latch.

A person skilled in the art may make changes and adaptations to the embodiments of the pneumatic telescopic column assembly and the extension and retraction methods according to the invention or can replace elements with others, which are functionally equivalent to satisfy contingent needs without departing from the scope of protection of the appended claims. All the features described above as belonging to one possible embodiment may be implemented independently from the other described embodiments.

The invention claimed is:

1. A pneumatic telescopic column assembly for supporting and moving military equipment, communication equipment, lighting equipment and/or surveillance equipment, the pneumatic telescopic column assembly extending along an axis (V-V) and comprising:

A) a plurality of tube groups telescopically configurable along the axis (V-V) between a compact configuration and an extended configuration, said plurality of tube groups comprising:

i) a base tube group comprising:
a tubular base element that extends between a lower tubular base element end and an upper tubular base element end,
a base locking ring that is fixed to the upper tubular base element end, wherein the base locking ring comprises at least one horizontal latch, at least one actuator comprising a stem orthogonal to the axis (V-V) and integrally connected to the at least one horizontal latch, and at least one vertical latch, wherein the at least one horizontal latch and the at least one vertical latch are spaced apart at an angle;

ii) an intermediate tube group comprising:
a tubular intermediate element that extends between a lower tubular intermediate element end and an upper tubular intermediate element end;
an intermediate locking ring that is fixed to the upper tubular intermediate element end, wherein the intermediate locking ring comprises at least one horizontal intermediate latch axially aligned with the at least one vertical latch and in which said at least one vertical latch is engageable;

iii) a head tube group comprising a tubular head element that extends between a lower tubular head element end and an upper tubular head element end, and B) means for injecting and discharging air, which are suitable for moving the plurality of tube groups, wherein, when moving between the compact configuration and the extended configuration:

the at least one horizontal intermediate latch moves horizontally between an unlocking position, in which the tubular head element is disengaged from the tubular intermediate element and the at least one vertical latch engages in the at least one horizontal intermediate latch, and a locking position, in which the tubular intermediate element engages in the tubular head element and the at least one horizontal intermediate latch engages in a horizontal intermediate latch seat made in the tubular head element; and the at least one actuator is actuated between a retracted position, in which the tubular intermediate element slides along the axis (V-V), and an advanced position, in which the at least one horizontal latch integral with the stem engages a horizontal latch seat made in the tubular intermediate element and blocks an extension of the tubular intermediate element relative to the tubular base element, and wherein the pneumatic telescopic column assembly further comprises at least one auxiliary intermediate tube group arranged between the base tube group and the intermediate tube group comprising:

an auxiliary tubular intermediate element that extends between a lower auxiliary tubular intermediate element end and an upper auxiliary tubular intermediate element end;

an auxiliary intermediate locking ring that is fixed to the upper auxiliary tubular intermediate element end, wherein the auxiliary intermediate locking ring comprises at least one horizontal auxiliary intermediate latch axially aligned with the at least one vertical latch and in which said at least one vertical latch is engageable, and at least one vertical auxiliary intermediate latch that is axially aligned with and engageable in the at least one horizontal intermediate latch, the at least one horizontal auxiliary intermediate latch and the at least one vertical auxiliary intermediate latch being spaced apart at an angle, wherein, when moving between the compact configuration and the extended configuration:

the at least one horizontal intermediate latch moves horizontally between the unlocking position, in which the tubular head element is disengaged from the tubular intermediate element and the at least one vertical auxiliary intermediate latch engages in the at least one horizontal intermediate latch, and the locking position, in which the tubular intermediate element engages in the tubular head element and the at least one horizontal intermediate latch engages in the horizontal intermediate latch seat that is made in the tubular head element, the at least one horizontal auxiliary intermediate latch moves horizontally between an auxiliary unlocking position, in which the tubular intermediate element is disengaged from the auxiliary tubular intermediate element and the at least one vertical latch engages in the at least one horizontal auxiliary intermediate latch, and an auxiliary locking position, in which the tubular intermediate element is engaged to the tubular auxiliary tubular intermediate element and the at least one horizontal auxiliary intermediate latch engages in the horizontal latch seat that is made in the tubular intermediate element; and the at least one actuator is actuated between a retracted position, in which the auxiliary tubular intermediate tubular element slides along the axis (V-V), and an advanced position, in which the at least one horizontal latch integral with the stem engages a latch seat made in the auxiliary tubular intermediate element and blocks an extension of the auxiliary tubular intermediate element relative to the base tubular base element, wherein the at least one vertical latch and the at least one vertical auxiliary intermediate latch respectively comprise a first guide surface and a second guide surface respectively engageable with a first counter-guide surface and a second counter-guide surface formed on the at least one horizontal auxiliary intermediate latch and the at least one horizontal intermediate latch, said first guide surface and first counter-guide surface lie on a pair of first parallel planes different from a pair of second parallel planes on which the second guide surface and the second counter-guide surface lie, wherein mutual sliding motion between the first guide surface and the first counter-guide surface moves the at least one horizontal auxiliary intermediate latch into the auxiliary locking position and/or the at least one horizontal intermediate latch into the locking position, and wherein mutual sliding motion between the second guide surface and the second counter-guide surface moves the at least one horizontal auxiliary intermediate latch into the auxiliary locking position and/or the at least one horizontal intermediate latch into the unlocking position.

2. The pneumatic telescopic column assembly of claim 1, comprising at least two auxiliary intermediate tube groups arranged in succession, so that the at least one vertical auxiliary intermediate latch of the auxiliary intermediate locking ring successive to the base tube group is vertically aligned with and engageable to the at least one horizontal auxiliary intermediate latch of the successive auxiliary intermediate locking ring.

3. The pneumatic telescopic column assembly of claim 1, wherein a mutual static engagement between the first guide surface and the first counter-guide surface defines a pre-locked configuration between two successive tube groups, wherein, when moving between the compact configuration and the extended configuration, the at least one horizontal auxiliary intermediate latch and/or the at least one horizontal intermediate latch freely slide on an outer wall of a tubular element of a successive tube group, and wherein, when moving between the extended configuration and the compact configuration, axial movement of a previous tubular element is blocked.

4. The pneumatic telescopic column assembly of claim 1, wherein the at least one horizontal auxiliary intermediate latch and the at least one horizontal intermediate latch each comprise:

a latch frame in which a frame through-hole is made; and a latch insert housable in the frame through-hole by shape and/or force coupling, an insert through-hole being made in said latch insert, the insert through-hole being delimited by four walls orthogonal to one another, wherein two walls that face one another are shaped so as to form the first counter-guide surface and the second counter-guide surface, said insert through-hole extending along an insert hole axis (I-I) parallel to the axis (V-V), and in which the at least one vertical latch and/or the at least one vertical auxiliary intermediate latch are engageable.

5. The pneumatic telescopic column assembly of claim 1, wherein the at least one horizontal auxiliary intermediate latch and the at least one horizontal intermediate latch extend between a tubular element engagement end sliding on an outer wall of a tubular element and engageable in one of the latch seat, the horizontal latch seat, or the horizontal intermediate latch seat, and a ring engagement end engageable by a locking ring by a pre-compressed elastic element that promotes translation of the at least one horizontal auxiliary intermediate latch into the auxiliary locking position or translation of the at least one horizontal intermediate latch into the locking position.

6. The pneumatic telescopic column assembly of claim 5, wherein the pre-compressed elastic element is a coil spring.

7. The pneumatic telescopic column assembly of claim 1, wherein the at least one actuator is a single-acting actuator in which the stem is extended in an advancement position.

8. The pneumatic telescopic column assembly of claim 1, wherein each tube group further comprises a piston provided with:
   a piston step for abutting a lower end of a tubular element, and
   a piston lift for fixing the tubular element to the piston.

9. The pneumatic telescopic column assembly of claim 1, wherein the base tube group, the intermediate tube group, and the at least one auxiliary intermediate tube group each comprise an end stop internally fixed respectively to the upper tubular base element end of the tubular base element, to the upper tubular intermediate element end of the tubular intermediate element and to the upper auxiliary tubular intermediate element end of the auxiliary tubular intermediate element to define a maximum excursion of a successive tube group.

10. The pneumatic telescopic column assembly of claim 1, wherein each locking ring comprises at least one anti-rotation tab that is slidingly and axially engaged in a guide respectively made in an outer wall of a successive tubular element.

11. The pneumatic telescopic column assembly of claim 10, wherein each locking ring comprises at least one annular band made of polymeric material and suitable for facilitating sliding motion of each locking ring on the outer wall of the successive tubular element.

12. A method for extending a pneumatic telescopic column assembly for supporting and moving military equipment, communication equipment, lighting equipment and/or surveillance equipment, the pneumatic telescopic column assembly extending along an axis (V-V) and comprising:
   A) a plurality of tube groups telescopically configurable along the axis (V-V) between a compact configuration and an extended configuration, said plurality of tube groups comprising:
      i) a base tube group comprising:
         a tubular base element that extends between a lower tubular base element end and an upper tubular base element end,
         a base locking ring that is fixed to the upper tubular base element end, wherein the base locking ring comprises at least one horizontal latch, at least one actuator comprising a stem orthogonal to the axis (V-V) and integrally connected to the at least one horizontal latch, and at least one vertical latch, wherein the at least one horizontal latch and the at least one vertical latch are spaced apart at an angle;
      ii) an intermediate tube group comprising:
         a tubular intermediate element that extends between a lower tubular intermediate element end and an upper tubular intermediate element end;
         an intermediate locking ring that is fixed to the upper tubular intermediate element end, wherein the intermediate locking ring comprises at least one horizontal intermediate latch axially aligned with the at least one vertical latch and in which said at least one vertical latch is engageable;
      iii) a head tube group comprising a tubular head element that extends between a lower tubular head element end and an upper tubular head element end, and
   B) means for injecting and discharging air, which are suitable for moving the plurality of tube groups,
wherein, when moving between the compact configuration and the extended configuration:
   the at least one horizontal intermediate latch moves horizontally between an unlocking position, in which the tubular head element is disengaged from the tubular intermediate element and the at least one vertical latch engages in the at least one horizontal intermediate latch, and a locking position, in which the tubular intermediate element engages in the tubular head element and the at least one horizontal intermediate latch engages in a horizontal intermediate latch seat made in the tubular head element; and
   the at least one actuator is actuated between a retracted position, in which the tubular intermediate element slides along the axis (V-V), and an advanced position, in which the at least one horizontal latch integral with the stem engages a horizontal latch seat made in the tubular intermediate element and blocks an extension of the tubular intermediate element relative to the tubular base element,
and wherein the pneumatic telescopic column assembly further comprises at least one auxiliary intermediate tube group arranged between the base tube group and the intermediate tube group comprising:
   an auxiliary tubular intermediate element that extends between a lower auxiliary tubular intermediate element end and an upper auxiliary tubular intermediate element end;
   an auxiliary intermediate locking ring that is fixed to the upper auxiliary tubular intermediate element end, wherein the auxiliary intermediate locking ring comprises at least one horizontal auxiliary intermediate latch axially aligned with the at least one vertical latch and in which said at least one vertical latch is engageable, and at least one vertical auxiliary intermediate latch axially aligned with and engageable in the at least one horizontal intermediate latch, the at least one horizontal auxiliary intermediate latch and the at least one vertical auxiliary intermediate latch being spaced apart at an angle,
wherein, when moving between the compact configuration and the extended configuration:
   the at least one horizontal intermediate latch moves horizontally between the unlocking position, in which the tubular head element is disengaged from the tubular intermediate element and the at least one vertical auxiliary intermediate latch engages in the at least one horizontal intermediate latch, and the locking position, in which the tubular intermediate element engages in the tubular head element and the at least one horizontal intermediate latch engages in the horizontal intermediate latch seat made in the tubular head element,
   the at least one horizontal auxiliary intermediate latch moves horizontally between an auxiliary unlocking position, in which the tubular intermediate element is disengaged from the auxiliary tubular intermediate element and the at least one vertical latch engages in the at least one horizontal auxiliary intermediate latch, and an auxiliary locking position, in which the tubular intermediate element is engaged to the auxiliary tubular intermediate element and the at least one horizontal auxiliary intermediate latch engages in the horizontal latch seat made in the tubular intermediate element; and
   the at least one actuator is actuated between a retracted position, in which the auxiliary tubular intermediate element slides along the axis (V-V), and an advanced position, in which the at least one horizontal latch integral with the stem engages a latch seat made in the auxiliary tubular intermediate element and blocks an extension of the auxiliary tubular intermediate element relative to the tubular base element,
wherein
the at least one vertical latch and the at least one vertical auxiliary intermediate latch respectively comprise a first guide surface and a second guide surface respectively engageable with a first counter-guide surface and a second counter-guide surface formed on the at least one horizontal auxiliary intermediate latch and the at least one horizontal intermediate latch,
said first guide surface and first counter-guide surface lie on a pair of first parallel planes different from a pair of second parallel planes on which the second guide surface and the second counter-guide surface lie,
wherein mutual sliding motion between the first guide surface and the first counter-guide surface moves the at least one horizontal auxiliary intermediate latch into the auxiliary locking position and/or the at least one horizontal intermediate latch into the locking position,
and wherein mutual sliding motion between the second guide surface and the second counter-guide surface moves the at least one horizontal auxiliary intermediate latch into the auxiliary locking position and/or the at least one horizontal intermediate latch into the unlocking position,
the method comprising:
injecting compressed air by means of the means for injecting and discharging air;
placing the pneumatic telescopic column assembly in a pre-locked configuration, in which the first guide surface engages in the first counter-guide surface;
extending the head tube group;
disengaging the at least one vertical latch from the at least one horizontal intermediate latch at a maximum degree of extension of the head tube group such that the at least one horizontal intermediate latch moves into the locking position, in which the tubular head element is engaged and axially locked to the tubular intermediate element and the at least one horizontal intermediate latch engages in the horizontal intermediate latch seat made in the tubular head element;
extending the intermediate tube group; and
moving the at least one actuator into the advanced position at a maximum degree of extension of the intermediate tube group, in which the at least one horizontal latch engages in the horizontal latch seat made in the tubular intermediate element and blocks an axial extension of the tubular intermediate element with respect to the tubular base element.

13. The method of claim 12, further comprising:
disengaging the at least one vertical auxiliary intermediate latch from the at least one horizontal intermediate latch at the maximum degree of extension of the head tube group so that the at least one horizontal intermediate latch moves into the locking position, in which the tubular head element is engaged and axially locked to the tubular intermediate element and the at least one horizontal intermediate latch engages in the horizontal intermediate latch seat made in the tubular head element;
extending the intermediate tube group;
disengaging the at least one vertical latch from the at least one horizontal auxiliary intermediate latch at the maximum extension of the intermediate tube group such that the at least one horizontal auxiliary intermediate latch moves into the auxiliary locking position, in which the tubular intermediate element is engaged and axially locked to the auxiliary tubular intermediate element and the at least one horizontal auxiliary intermediate latch engages in the horizontal latch seat made in the tubular intermediate element;
extending the at least one auxiliary intermediate tube group; and
moving the at least one actuator into the advancement position, in which the at least one horizontal latch engages in the latch seat made in the auxiliary tubular intermediate element and blocks the axial extension of the auxiliary tubular intermediate element with respect to the tubular base element.

14. A method for retracting a pneumatic telescopic column assembly for supporting and moving military equipment, communication equipment, lighting equipment and/or surveillance equipment, the pneumatic telescopic column assembly extending along an axis (V-V) and comprising:
A) a plurality of tube groups telescopically configurable along the axis (V-V) between a compact configuration and an extended configuration, said plurality of tube groups comprising:
i) a base tube group comprising:
a tubular base element that extends between a lower tubular base element end and an upper tubular base element end,
a base locking ring that is fixed to the upper tubular base element end, wherein the base locking ring comprises at least one horizontal latch, at least one actuator comprising a stem orthogonal to the axis (V-V) and integrally connected to the at least one horizontal latch, and at least one vertical latch, wherein the at least one horizontal latch and the at least one vertical latch are spaced apart at an angle;
ii) an intermediate tube group comprising:
a tubular intermediate element that extends between a lower tubular intermediate element end and an upper tubular intermediate element end;
an intermediate locking ring that is fixed to the upper tubular intermediate element end, wherein the intermediate locking ring comprises at least one horizontal intermediate latch axially aligned with the at least one vertical latch and in which said at least one vertical latch is engageable;
iii) a head tube group comprising a tubular head element that extends between a lower tubular head element end and an upper tubular head element end, and
B) means for injecting and discharging air, which are suitable for moving the plurality of tube groups,
wherein, when moving between the compact configuration and the extended configuration:
the at least one horizontal intermediate latch moves horizontally between an unlocking position, in which the tubular head element is disengaged from the tubular intermediate element and the at least one vertical latch engages in the at least one horizontal intermediate latch, and a locking position, in which the tubular intermediate element engages in the tubular head element and the at least one horizontal intermediate latch engages in a horizontal intermediate latch seat made in the tubular head element; and
the at least one actuator is actuated between a retracted position, in which the tubular intermediate element slides along the axis (V-V), and an advanced position, in which the at least one horizontal latch integral with the stem engages a horizontal latch seat made in the tubular intermediate element and blocks an extension of the tubular intermediate element relative to the tubular base element,
and wherein the pneumatic telescopic column assembly further comprises at least one auxiliary intermediate tube group arranged between the base tube group and the intermediate tube group comprising:
   an auxiliary tubular intermediate element that extends between a lower auxiliary tubular intermediate element end and an upper auxiliary tubular intermediate element end;
   an auxiliary intermediate locking ring that is fixed to the upper auxiliary tubular intermediate element end, wherein the auxiliary intermediate locking ring comprises at least one horizontal auxiliary intermediate latch axially aligned with the at least one vertical latch and in which said at least one vertical latch is engageable, and at least one vertical auxiliary intermediate latch axially aligned with and engageable in the at least one horizontal intermediate latch, the at least one horizontal auxiliary intermediate latch and the at least one vertical auxiliary intermediate latch being spaced apart at an angle,
wherein, when moving between the compact configuration and the extended configuration:
the at least one horizontal intermediate latch moves horizontally between the unlocking position, in which the tubular head element is disengaged from the tubular intermediate element and the at least one vertical auxiliary intermediate latch engages in the at least one horizontal intermediate latch, and the locking position, in which the tubular intermediate element engages in the tubular head element and the at least one horizontal intermediate latch engages in the horizontal intermediate latch seat made in the tubular head element,
the at least one horizontal auxiliary intermediate latch moves horizontally between an auxiliary unlocking position, in which the tubular intermediate element is disengaged from the auxiliary tubular intermediate element and the at least one vertical latch engages in the at least one horizontal auxiliary intermediate latch, and an auxiliary locking position, in which the tubular intermediate element is engaged to the auxiliary tubular intermediate element and the at least one horizontal auxiliary intermediate latch engages in the horizontal latch seat made in the tubular intermediate element; and
the at least one actuator is actuated between a retracted position, in which the auxiliary tubular intermediate element slides along the axis (V-V), and an advanced position, in which the at least one horizontal latch integral with the stem engages a latch seat made in the auxiliary tubular intermediate element and blocks an extension of the auxiliary tubular intermediate element relative to the tubular base element,
wherein
the at least one vertical latch and the at least one vertical auxiliary intermediate latch respectively comprise a first guide surface and a second guide surface respectively engageable with a first counter-guide surface and a second counter-guide surface formed on the at least one horizontal auxiliary intermediate latch and the at least one horizontal intermediate latch,
said first guide surface and first counter-guide surface lie on a pair of first parallel planes different from a pair of second parallel planes on which the second guide surface and the second counter-guide surface lie,
wherein mutual sliding motion between the first guide surface and the first counter-guide surface moves the at least one horizontal auxiliary intermediate latch into the auxiliary locking position and/or the at least one horizontal intermediate latch into the locking position,
and wherein mutual sliding motion between the second guide surface and the second counter-guide surface moves the at least one horizontal auxiliary intermediate latch into the auxiliary locking position and/or the at least one horizontal intermediate latch into the unlocking position,
the method comprising:
   discharging compressed air into the environment by the means for injecting and discharging air;
   moving the at least one actuator into the retracted position to disengage the at least one horizontal latch from the horizontal latch seat made in the tubular intermediate element and to unblock axial sliding motion of the tubular intermediate element;
   retracting the intermediate tube group; and
   engaging the first guide surface of the at least one vertical latch with the first counter-guide surface of the at least one horizontal intermediate latch to bring about movement of the at least one horizontal intermediate latch into the unlocking position, in which the tubular head element is disengaged from the tubular intermediate element and the at least one horizontal intermediate latch is disengaged from the horizontal intermediate latch seat made in the tubular head element;
   retracting the head tube group so as to place the pneumatic telescopic column assembly in a pre-locked configuration; and
   retracting the pneumatic telescopic column assembly into the compact configuration.

15. The method of claim 14, further comprising:
   moving the at least one actuator into the retracted position to disengage the at least one horizontal latch from the latch seat made in the auxiliary tubular intermediate element and to unblock axial sliding motion of the auxiliary tubular intermediate element;
   retracting the at least one auxiliary intermediate tube group;
   engaging the first guide surface of the at least one vertical latch with the first counter-guide surface of the at least one horizontal auxiliary intermediate latch to bring about movement of the at least one horizontal auxiliary intermediate latch into the auxiliary unlocking position, in which the tubular intermediate element is disengaged from the auxiliary tubular intermediate element and the at least one horizontal auxiliary intermediate latch is disengaged from the horizontal latch seat made in the tubular intermediate element;
   retracting the intermediate tube group; and
   engaging the first guide surface of the at least one vertical auxiliary intermediate latch with the first counter-guide surface of the at least one horizontal intermediate latch to bring about movement of the at least one horizontal intermediate latch into the unlocking position, in which the tubular head element is disengaged from the tubular intermediate element and the at least one horizontal intermediate latch is disengaged from the horizontal intermediate latch seat made in the tubular head element.

* * * * *